United States Patent
Yang et al.

(10) Patent No.: US 10,647,098 B2
(45) Date of Patent: May 12, 2020

(54) BASE FILM

(71) Applicant: LG Chem, Ltd., Seoul (KR)

(72) Inventors: Se Woo Yang, Daejeon (KR); Sung Hyun Nam, Daejeon (KR); Kyun Il Rah, Daejeon (KR)

(73) Assignee: LG Chem, Ltd. (KR)

( * ) Notice: Subject to any disclaimer, the term of this patent is extended or adjusted under 35 U.S.C. 154(b) by 56 days.

(21) Appl. No.: 15/740,106

(22) PCT Filed: Jul. 1, 2016

(86) PCT No.: PCT/KR2016/007108
§ 371 (c)(1),
(2) Date: Dec. 27, 2017

(87) PCT Pub. No.: WO2017/003249
PCT Pub. Date: Jan. 5, 2017

(65) Prior Publication Data
US 2018/0194121 A1 Jul. 12, 2018

(30) Foreign Application Priority Data
Jul. 1, 2015 (KR) .......................... 10-2015-0094358

(51) Int. Cl.
*B32B 27/40* (2006.01)
*C08G 18/06* (2006.01)
(Continued)

(52) U.S. Cl.
CPC .............. *B32B 27/40* (2013.01); *B05D 5/061* (2013.01); *B29D 11/00644* (2013.01);
(Continued)

(58) Field of Classification Search
CPC ..................... B29D 11/00644; B32B 2307/42
See application file for complete search history.

(56) References Cited

U.S. PATENT DOCUMENTS 4,521,582 A * 6/1985 Goyert ................... C08G 18/10
528/65
6,527,995 B1 3/2003 Kaufhold et al.
(Continued)

FOREIGN PATENT DOCUMENTS

CN 101321796 A 12/2008
CN 101765645 A 6/2010
(Continued)

OTHER PUBLICATIONS

Extended European Search Report including Written Opinion for Application No. EP16818282.2 dated Jun. 12, 2018.
(Continued)

*Primary Examiner* — Ramsey Zacharia
(74) *Attorney, Agent, or Firm* — Lerner, David, Littenberg, Krumholz & Mentlik, LLP

(57) ABSTRACT

The present application relates to a method for preparing a base film, a laminate or a polarizing film. The present application can provide an elongatable base film which simultaneously maintains elongation and recovery rates at proper levels and guarantees water resistance, and thus can be effectively applied in the preparation of, for example, a polarizing film. The present application can also provide a laminate using the film or a method for preparing a polarizing film using the base film. The base film can be effectively applied in the preparation of a polarizing film having an excellent function, such as polarization performance, while having a thickness of, for example, about 10 μm or less, about 8 μm or less, about 7 μm or less, about 6 μm or less, or about 5 μm or less.

18 Claims, 1 Drawing Sheet

(51) Int. Cl.

| | | |
|---|---|---|
| *G02B 5/30* | (2006.01) | |
| *C08L 75/04* | (2006.01) | |
| *C08K 3/26* | (2006.01) | |
| *C08K 3/34* | (2006.01) | |
| *G02F 1/1335* | (2006.01) | |
| *C08G 18/76* | (2006.01) | |
| *C08G 18/42* | (2006.01) | |
| *C08J 5/18* | (2006.01) | |
| *B29D 11/00* | (2006.01) | |
| *B05D 5/06* | (2006.01) | |
| *G02B 1/14* | (2015.01) | |
| *G02B 1/08* | (2006.01) | |

(52) U.S. Cl.
CPC ..... *C08G 18/4202* (2013.01); *C08G 18/4238* (2013.01); *C08G 18/7607* (2013.01); *C08G 18/7621* (2013.01); *C08G 18/7671* (2013.01); *C08J 5/18* (2013.01); *C08K 3/26* (2013.01); *C08K 3/346* (2013.01); *C08L 75/04* (2013.01); *G02B 5/30* (2013.01); *G02B 5/305* (2013.01); *G02F 1/1335* (2013.01); *C08K 2003/265* (2013.01); *C08L 2203/16* (2013.01); *G02B 1/08* (2013.01); *G02B 1/14* (2015.01)

(56) References Cited

U.S. PATENT DOCUMENTS

| | | | |
|---|---|---|---|
| 2004/0198944 A1* | 10/2004 | Meltzer | C08G 18/0895 528/80 |
| 2009/0104449 A1 | 4/2009 | Farah et al. | |
| 2011/0105682 A1 | 5/2011 | Yoshida et al. | |
| 2011/0315306 A1 | 12/2011 | Goto et al. | |
| 2012/0123043 A1* | 5/2012 | Nakamura | C08H 6/00 524/507 |
| 2015/0146293 A1 | 5/2015 | Sasaki | |
| 2015/0210799 A1 | 7/2015 | Tanaka | |
| 2015/0274958 A1* | 10/2015 | Henze | C08G 18/664 525/123 |
| 2015/0299377 A1* | 10/2015 | Makal | C08G 18/4854 442/361 |
| 2016/0070042 A1 | 3/2016 | Yang et al. | |
| 2016/0195641 A1 | 7/2016 | Yang et al. | |
| 2018/0194121 A1 | 7/2018 | Yang et al. | |

FOREIGN PATENT DOCUMENTS

| | | | | |
|---|---|---|---|---|
| CN | 104619738 A | | 5/2015 | |
| EP | 2881412 A1 | | 6/2015 | |
| JP | 59169820 A | * | 9/1984 | ....... B29D 11/00413 |
| JP | H9302218 A | | 11/1997 | |
| JP | 2005272614 A | | 10/2005 | |
| JP | 200831317 A | | 2/2008 | |
| JP | 2012144654 A | | 8/2012 | |
| JP | 2018522275 A | | 8/2018 | |
| KR | 20010049784 A | | 6/2001 | |
| KR | 20060027777 A | | 3/2006 | |
| KR | 20100009578 A | | 1/2010 | |
| KR | 101175700 B1 | | 8/2012 | |
| KR | 20130135768 A | | 12/2013 | |
| KR | 20140147766 A | | 12/2014 | |
| TW | 201515815 A | | 5/2015 | |
| WO | 2013191102 A1 | | 12/2013 | |
| WO | 2014024847 A1 | | 2/2014 | |
| WO | 2014204248 A2 | | 12/2014 | |

OTHER PUBLICATIONS

Search report from International Application No. PCT/KR2016/007108, dated Sep. 12, 2016.

Chinese Search Report for Application No. CN201680038857.X dated Feb. 1, 2019.

* cited by examiner

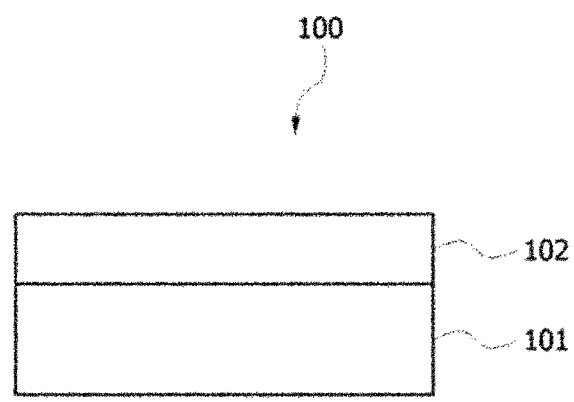

BASE FILM

CROSS-REFERENCE TO RELATED APPLICATIONS

The present application is a national phase entry under 35 U.S.C. § 371 of International Application No. PCT/KR2016/007108 filed on Jul. 1, 2016, which claims priority from Korean Patent Application No. 10-2015-0094358 filed on Jul. 1, 2015, the disclosures of which are incorporated herein by reference.

TECHNICAL FIELD

The present application relates to a base film, a laminate and a process for preparing a polarizing film.

BACKGROUND ART

A method for preparing a polarizing film in which a dichroic material is adsorbed and oriented on a PVA (poly(vinyl alcohol)) layer is known. A typical application in which a polarizing film is used is a display device such as a liquid crystal display (LCD). For example, a PVA-based polarizing film having a thickness of about 60 μm to 80 μm or so is usually attached to both sides of a liquid crystal panel of a liquid crystal display.

The PVA resin is hydrophilic, and thus the polarizing film is sensitive to a change in temperature or humidity, is easy to elongate and contract, and easily causes defects such as so-called curls. Therefore, in order to inhibit the elongation and contraction and reduce the influence on temperature and humidity, usually, a protective film is attached to both sides of the PVA-based polarizing film. However, if the polarizing film is too thick, it is not easy to inhibit the elongation and contraction, and when the polarizing film is adhered to a liquid crystal panel or the like, stress is generated, thereby causing spots or the like on the screen. In addition, recently, while the demand for thin-type devices or low energy-consuming devices increases, the demand for thinner polarizing films is also increasing.

For example, Patent Document 1 and the like disclose a process for producing a thin polarizing film.

PRIOR ART DOCUMENT

Patent Document

Patent Document 1: Korean Patent No. 1175700

DISCLOSURE

Technical Problem

The present application provides a base film, a laminate and a process for preparing a polarizing film.

Technical Solution

The present application relates to a base film. The base film may be a film (hereinafter, optionally referred to as a film for elongation or a base film for elongation) used in a process of elongating a material capable of exhibiting polarization function such as PVA (poly(vinyl alcohol)). As shown in the FIGURE, for example, the elongating process may be performed by laminating a layer (102) (hereinafter, optionally referred to as a polarizing functional material layer) comprising a material (hereinafter, optionally referred to as a polarizing functional material) capable of exhibiting polarization function by elongation, to one or both sides of the base film (101) to prepare a laminate (100) and elongating the laminate in a state where the laminate is prepared.

In order for the base film to be applied to the elongating process, the elongation rate should be basically excellent. The base film having a high elongation rate generally has a high recovery rate. If the recovery rate of the base film is high, there arises a problem that the first elongated polarizing functional material shrinks, and thus the performance of the polarizing film is lowered. Therefore, the base film is required to have a low recovery rate while having a high elongation.

One example of the present application can provide, in a base film comprising polyurethane, for example, thermoplastic polyurethane (hereinafter, TPU), a film in which the elongation rate and the recovery rate are simultaneously adjusted to a proper level through control of the composition of the TPU. Another example of the present application can provide a film in which the elongation rate and the recovery rate are simultaneously adjusted to a proper level by incorporating inorganic particles into the base film. In the present application, as a method of adjusting the elongation rate and the recovery rate simultaneously to a proper level, any one method of the method of adjusting the composition of the TPU and the method of incorporating inorganic particles into the base film may be used, or the methods may be applied simultaneously.

The base film of the present application comprises the TPU, and for example, may comprise the TPU as a main component. In the present application, the phrase "base film comprises TPU as a main component" may mean a case in which the TPU in the base film has a ratio of 80% or more, 85% or more, 90% or more, or 95% or more on the basis of weight. Here, the upper limit of the TPU ratio in the base film is not particularly limited, and may be, for example, about 100% or so.

In this specification, the base film comprising TPU as a main component can be simply referred to as TPU film. In addition, in the present application, the TPU film may refer to a single layer film comprising TPU as a main component as described above, or may refer to a multi-layered film comprising at least the single layer.

The TPU can be prepared by reacting a polyol, a multivalent isocyanate and a chain extender. In the TPU thus prepared, soft segments and hard segments are present. The soft segments are primarily formed by the polyol and the hard segments are primarily formed by urethane or urea bonds resulting from the reaction of the multivalent isocyanate with the chain extender and the unreacted products of these components. Therefore, by adjusting the ratio between the raw material components in the TPU, the ratio of the soft and hard segments can be controlled, and the physical properties required in the base film for elongation can be ensured. For example, if the ratio of the soft segments in the TPU is increased and the ratio of the hard segments is reduced, the elongation rate of the film can be increased. However, since the increased soft segments can increase the recovery rate of the film, it is difficult to adjust the elongation rat and the recovery rate simultaneously to an appropriate level simply only by adjusting the ratio between soft and hard segments. The present application can provide a film in which the elongation rate and the recovery rate are simultaneously maintained at an appropriate level through an operation as described below in the TPU, which is a reaction product of a mixture containing a polyol, a multivalent isocyanate and a chain extender.

The mixture forming TPU may comprise two or more chain extender as the chain extender or may comprise two or more isocyanates as the multivalent isocyanate. Accordingly, the base film comprising the TPU can exhibit excellent water resistance while exhibiting proper elongation rate and recovery rate characteristics. The mixture may contain two or more chain extender and two or more multivalent isocyanates in order to ensure proper physical properties.

As the chain extender, for example, an aliphatic diol having 1 to 20 carbon atoms, 1 to 16 carbon atoms, 1 to 12 carbon atoms or 1 to 8 carbon atoms such as ethylene glycol, 1,6-hexanediol, 1,4-butanediol, 1,5-pentanediol, 1,6-pentanediol, neopentyl glycol or 1,4-cyclohexane dimethanol can be used. In one example of the present application, an aliphatic diol having 5 or more carbon atoms (first diol) and an aliphatic diol having 4 or less carbon atoms (second diol) can be simultaneously used, as the chain extender, for controlling the elongation rate, recovery rate and water resistance. In another example, the first diol may be a diol having 5 to 20 carbon atoms, 5 to 16 carbon atoms, 5 to 12 carbon atoms, or 5 to 8 carbon atoms. When these two aliphatic diols are used as the chain extender, it can be advantageous to simultaneously keep the elongation rate and the recovery rate at an appropriate level and to secure the water resistance. Among the two aliphatic diols, the second diol may be used in the mixture in a ratio of not more than 30 parts by weight relative to 100 parts by weight of the polyol. The second diol may be used in an amount of at least 5 parts by weight, at least 10 parts by weight, at least 15 parts by weight, at least 20 parts by weight, or at least 25 parts by weight relative to 100 parts by weight of the polyol. In the present application, the term "part by weight" may mean a weight ratio between components, unless otherwise specified. In the mixture, a ratio (A/B) of the weight (B) of the first diol and the weight (A) of the second diol may be 1 or less. In another example, the ratio (A/B) may be less than 1, or 0.95 or less, 0.9 or less, or 0.85 or less. In another example, the ratio (A/B) may be 0.1 or more, 0.2 or more, 0.3 or more, 0.4 or more, 0.5 or more, 0.6 or more, or 0.7 or more. In such a range, the base film can be provided, which secures water resistance while maintaining excellent elongation rate and recovery rate at the same time.

The total amount of such a chain extender in the mixture may be at least 50 parts by weight, at least 55 parts by weight or at least 60 parts by weight relative to 100 parts by weight of the polyol. The total amount may be 200 parts by weight or less, 150 parts by weight or less, 100 parts by weight or less, or 80 parts by weight or less relative to 100 parts by weight of the polyol.

As the multivalent isocyanate contained in the mixture forming the TPU, for example, an aliphatic or aromatic disocyanate, which is one used for forming the hard segment, such as toluene diisocyanate, xylene diisocyanate, diphenylmethane diisocyanate, hexamethylene diisocyanate, isophorone diisocyanate, tetramethylxylene diisocyanate, methylenediphenyl diisocyanate or naphthalene diisocyanate can be used. In one example of the present application, a multivalent isocyanate having an aromatic core having 12 or more carbon atoms (hereinafter, optionally referred to as a first isocyanate) and a multivalent isocyanate having an aromatic core having less than 12 carbon atoms (hereinafter, optionally referred to as a second isocyanate) may be used at the same time, as the multivalent isocyanate, for controlling the elongation rate and the recovery rate. Here, the term core may mean a moiety to which the isocyanate functional group of the multivalent isocyanate is connected and the term aromatic core may mean that the core has been derived from an aromatic compound. On the other hand, the term aromatic compound herein, unless otherwise specified, may be benzene; or a compound or a derivative thereof comprising a structure in which two or more benzenes are condensed or bonded while sharing one or two or more carbon atoms; or a structure in which two or more benzenes are linked via a linker such as an alkylene group. In another example, the aromatic core of the multivalent isocyanate having the aromatic core having 12 or more carbon atoms may be an aromatic core having 12 to 30 carbon atoms, 12 to 24 carbon atoms, 12 to 18 carbon atoms, or 12 to 15 carbon atoms, and the multivalent isocyanate having such an aromatic core can be exemplified by MDI (methylene diphenyl 4,4'-diisocyanate) and the like, but is not limited thereto. Also, in another example, the aromatic core of the multivalent isocyanate having the aromatic core having less than 12 carbon atoms may be an aromatic core having 6 to 11 carbon atoms, and the multivalent isocyanate containing such an aromatic core can be exemplified by TDI (toluene diisocyanate) and the like, but is not limited thereto. When these two isocyanates are used, it is advantageous to simultaneously keep the elongation rate and the recovery rate at an appropriate level and to secure the water resistance. In the two isocyanates, the first isocyanate may be contained in the mixture in an amount of at least 150 parts by weight relative to 100 parts by weight of the polyol. Here, the ratio of the first isocyanate may be 200 parts by weight or less, 190 parts by weight or less, 180 parts by weight or less, 170 parts by weight or less, or 160 parts by weight or less relative to 100 parts by weight of the polyol. In the mixture, a ratio (C/D) of the weight (C) of the first isocyanate and the weight (D) of the second isocyanate may be 30 or less. In another example, the ratio (C/D) may be 25 or less, 23 or less, or 22 or less. In another example, the ratio (C/D) may be 5 or more, 10 or more, or 15 or more. In such a range, the base film can be provided, which secures water resistance while maintaining excellent elongation and recovery at the same time.

The total amount of the multivalent isocyanate in the mixture may be 150 parts by weight or more relative to 100 parts by weight of the polyol. In another example, the total amount may be 200 parts by weight or less, 190 parts by weight or less, 180 parts by weight or less, 170 parts by weight or less, or 160 parts by weight or less relative to 100 parts by weight of the polyol.

The ratio between the components, i.e., the polyol, the multivalent isocyanate, and the chain extender, in the mixture forming the TPU is not particularly limited, and for example, can be selected such that the soft and hard segments are present in an appropriate ratio in the TPU to exhibit the above-described characteristics. In one example, the total weight of the multivalent isocyanate component and the chain extender in the mixture may be in the range of at least about 100 parts by weight relative to 100 parts by weight of the polyol component. For example, the mixture may comprise the multivalent isocyanate and the chain extender in an amount of 100 parts by weight to 300 parts by weight or 100 parts by weight to 250 parts by weight relative to 100 parts by weight of the polyol component. In such a range, the soft and hard segments in the TPU can be present in the appropriate ratio to be intended in the present application.

The kind of the polyol contained in the mixture forming the TPU is not particularly limited. For example, one or more components selected from the group consisting of an aliphatic or aromatic polyether glycol, an aliphatic or aromatic polyester glycol and polycaprolactone glycol, which is one conventionally used for forming soft segments, can be used as the polyol. For example, the polyester polyol may be produced by reacting an dibasic acid such as adipic acid, sebasic acid, isophthalic acid, dimethyl terephthalate, terephthalic acid, dimethyl phthalate, phthalic acid, dimethyl isophthalate, dimethyl naphthalene 2,6-dicarboxylic acid, oxalic acid, malonic acid, succinic acid, glutaric acid, azelaic acid, nona acid or dodeca-deca acid with glycol. In view of securing the respective properties or ease of control as described above, the polyol having a weight average molecular weight within a range of about 500 to 5,000 can be used. In the present application, the term "weight average molecular weight" may mean a conversion value of standard polystyrene measured by GPC (Gel Permeation Chromatograph) unless otherwise specified, and the term molecular weight may mean a weight average molecular weight, unless otherwise defined.

In one example, the mixture forming the TPU may comprise two or more polyols.

For example, the mixture may comprise a first polyol having a molecular weight of 1500 or less and a second polyol having a molecular weight of more than 1500. In another example, the molecular weight of the first polyol may be 1400 or less, 1300 or less, or 1200 or less. Also, in another example, the molecular weight of the first polyol may be 500 or more, 600 or more, 700 or more, or 800 or more. On the other hand, in another example, the molecular weight of the second polyol may be 1600 or more, 1700 or more, or 1800 or more. Also, in another example, the molecular weight of the second polyol may be 5000 or less, 4500 or less, 4000 or less, 3500 or less, 3000 or less, or 2500 or less. Through the use of these two polyols, the TPU having excellent elongation rate and recovery rate characteristics and having good water resistance can be provided.

The ratio of the first and second polyols can be adjusted in view of the overall elongation and recovery characteristics and the water resistance of the TPU. For example, the second polyol may be contained in a ratio of 50 parts by weight to 200 parts by weight relative to 100 parts by weight of the first polyol. In another example, the ratio of the second polyol may be in the range of 60 to 200 parts by weight, 70 to 200 parts by weight, 80 to 200 parts by weight, 90 to 200 parts by weight, 90 to 190 parts by weight, 90 to 180 parts by weight, 90 to 170 parts by weight, 90 to 160 parts by weight, 90 to 150 parts by weight, 90 to 140 parts by weight, 90 to 130 parts by weight or 90 to 120 parts by weight or so relative to 100 parts by weight of the first polyol.

In the present application, the method for producing TPU by reacting the mixture is not particularly limited and a known method can be applied. Also, the method for producing the film using the TPU is not particularly limited, and for example, all the known film forming methods such as casting, pressing, extruding, calendering or blow molding can be applied. In addition, in the process of producing the TPU film, no elongating process can be applied, or uniaxial, biaxial or multiaxial elongation can be appropriately applied.

The TPU as above may have a molecular weight (Mw) in the range of 100,000 to 400,000. In another example, the molecular weight (Mw) may be 150,000 or more, 180,000 or more, or about 200,000 or more. In another example, the molecular weight (Mw) may be about 350,000 or less, about 300,000 or less, or about 250,000 or less. In such a range, a base film can be provided, which secure water resistance while maintaining excellent elongation rate and recovery rate at the same time.

The TPU film may comprise inorganic particles. As described above, even when the inorganic particles are appropriately applied, a film having excellent balance between the elongation rate and the recovery rate can be provided. The TPU contained in the TPU film comprising the inorganic particles may be a general TPU, or a TPU film in which the composition is controlled, as described above. As the inorganic particles that can be included in the TPU film, known particles can be used without any particular limitation. As the inorganic particles, roughly spherical inorganic particles may be used, or other types of inorganic particles may be used, without being limited thereto. The kind of the inorganic particles is not particularly limited, and in general, most of the particles used in the production of the film can be applied. For example, as the inorganic particles, talc, an antioxidant or calcium carbonate and the like can be used. The inorganic particles may be contained in the film in a ratio of about 0.01 to 10 parts by weight relative to 100 parts by weight of the TPU, and in such a ratio range, the film can maintain excellent balance between the elongation rate and the recovery rate and secure water resistance. In another example, the ratio may be at least 0.05 parts by weight or at least 0.1 parts by weight. Also, in another example, the ratio may be 9 parts by weight or less, 8 parts by weight or less, 7 parts by weight or less, 6 parts by weight or less, 5 parts by weight or less, 4 parts by weight or less, 3 parts by weight or less, or 2 parts by weight or less.

The base film may comprise the above-mentioned TPU, and if necessary, may appropriately comprise known additives which may typically be contained in the film within a range that they do not impair the desired effects, while further comprising inorganic particles.

The base film may have an appropriate level of thickness within the range that exhibits the above-mentioned characteristics, and may have a thickness within a range of, for example, about 50 μm to 300 μm or about 100 μm to 200 μm, but is not limited thereto.

In order to more efficiently perform the above-described elongating process and to obtain a high functional thin polarizing film, the characteristics of the base film as above can be determined in consideration of the characteristics of the polarizing functional material layer to be elongated together.

Here, the characteristics of the base film may include various physical properties which can be measured, for example, by a tensile test. The tensile curve identified in the tensile test can be usually classified into a tensile curve expressed as a relationship of an elongation degree (mm) to the applied load (load-versus-elongation curve; and a tensile curve expressed as a relationship of engineering strain to engineering stress (stress-versus-strain curve), and the characteristics specified in this specification may be characteristics identified from the latter, that is, the tensile curve expressed as a relationship of engineering strain to engineering stress, unless otherwise specified.

In the present application, the tensile curve is shown in the following manner. First, a specimen to measure the tensile curve is prepared so that the width is 15 mm and the length is 70 mm. The width and length of the specimen are a length except for the portion to be fixed to the tensile tester for tension. After the specimen is fixed to the tensile tester, the specimen is tensioned at a tensile rate of about 300 mm/min at room temperature in the longitudinal direction until it is cut, and then the graph of the force (X-axis: distance, Y-axis:

force), as measured depending on the distance until the specimen is cut, is depicted. Thereafter, the graph is converted into a graph of elongation rate and tensile strength (X-axis: elongation, Y-axis) by applying the width and thickness of the specimen, and from the converted graph, each tensile characteristic can be measured. The term normal temperature herein is a natural temperature without warming or cooling, and may mean a temperature of about 10° C. to 30° C., about 25° C. or about 23° C. or so. In addition, when the physical property is defined herein, the physical property corresponds to a physical property measured at room temperature, unless otherwise specified.

For example, the base film can satisfy the following equation 1 from the viewpoint of preventing defects due to contraction after elongating the polarizing functional material layer as described below.

$$E/R \geq 5 \quad \text{[Equation 1]}$$

In Equation 1, E is an elongation rate (unit: %) of the base film for elongation measured at room temperature, and R is a recovery rate (unit: %). Here, the elongation rate can be calculated from the tensile curve obtained by performing the tensile test as described above at the measurement temperature.

In addition, the recovery rate is a value measured by substituting a longitudinal length (T) of the base film, which is measured after elongating a laminate prepared by attaching to one side of the base film tailored to have a width of 50 mm and a length of 100 mm a PVA (poly(vinyl alcohol)) film having the same width and length and a thickness of 30 m in water (temperature: 60° C.) five times in the longitudinal direction, and then taking it out from water, peeling the PVA film off, and maintaining the base film at room temperature for 1 hour, into an equation "100×(T−A)/A," where A is a longitudinal length of the base film before elongation.

When the ratio (E/R) according to Equation 1 is controlled to fall within the above range, a polarizing film having excellent polarizing function or transmittance while having a very thin shape can be obtained through effective elongation in an elongating process described below. In another example, the ratio (E/R) may be 10 or more, 15 or more, 20 or more, 25 or more, 30 or more, 35 or more, 40 or more, 45 or more, 50 or more, 55 or more, 60 or more, or 65 or more. In another example, the ratio (E/R) may be 600 or less, 500 or less, 400 or less, 300 or less, 200 or less, 100 or less, or 90 or less.

The base film may have the above elongation rate within a range of about 200% to 1500% while satisfying Equation 1. In another example, the elongation rate may be at least about 250%, at least about 300%, at least about 400%, at least about 500%, at least about 600%, or at least about 650%. In another example, the elongation rate may be about 1400% or less, 1300% or less, 1200% or less, or 1100% or less.

The recovery rate of the base film may also be 30% or less, 25% or less, or about 20% or less. The recovery rate may also be about 5% or more or about 10% or more.

The base film may have an integrated value of the tensile curve measured by the above-mentioned method (a graph of elongation rate and tensile strength (X axis: elongation rate, Y axis: tensile strength) measured while being elongated until the specimen is cut) in the range of 2000 Nmm to 10,000 Nmm. In another example, the integrated value may be 2500 Nmm or more, 3000 Nmm or more, 3500 Nmm or more, or 4000 Nmm or more. In another example, the integrated value may also be 9000 Nmm or less, 8000 Nmm or less, or 7600 Nmm or less. Such a range can be advantageous for forming a highly functional polarizing film while having a very thin type in an elongating process as described below.

The tensile strength of the base film may be, for example, in the range of 45 MPa to 200 MPa. In another example, the tensile strength may be 50 MPa or more. In another example, the tensile strength may also be 150 MPa or less, or 100 MPa or less. Such a range can be advantageous for forming a highly functional polarizing film while having a very thin type in an elongating process as described below.

The base film may have a yield point, for example, in the range of 10 MPa to 150 MPa. In another example, the yield point may be 15 MPa or more. In another example, the yield point may also be 100 MPa or less. Such a range can be advantageous for forming a highly functional polarizing film while having a very thin type in an elongating process as described below.

The base film may have an elastic limit, for example, in the range of 200 MPa to 1,000 MPa. In another example, the elastic limit may be 250 MPa or more, 300 MPa or more, or 350 MPa or more. In another example, the elastic limit may also be 900 MPa or less, 850 MPa or less, or 800 MPa or less. Such a range can be advantageous for forming a highly functional polarizing film while having a very thin type in an elongating process as described below.

If the base film is selected in relation to the polarizing functional material layer so as to satisfy at least one of the physical properties mentioned above, for example, a polarizing film exhibiting a high function while having a very thin type, for example a thickness of about 10 μm or less, about 8 μm or less, about 7 μm or less, about 6 μm or less, or about 5 μm or less can be effectively produced by the elongating process, and the occurrence of tearing or curls of the polarizing film in this process and the like can also be effectively prevented.

For example, the base film may be selected so that an absolute value of the difference (A−B) between the integrated value (A) of the tensile curve and the integrated value (B) of the polarizing functional material layer measured in the same manner falls within a range of 1,500 Nmm to 10,000 Nmm. In another example, the absolute value of the difference may be at least 2,000 Nmm, at least 2,500 Nmm, at least 3,000 Nmm, at least 3,500 Nmm, or at least about 4,000 Nmm. Also, in another example, the absolute value of the difference may be about 9,000 Nmm or less, 8,000 Nmm or less, 7,000 Nmm or less, or 6,500 Nmm or less.

For example, the base film may be selected so that an absolute value of the difference between the tensile strength thereof and the tensile strength of the polarizing functional material layer falls within a range of about 0.5 MPa to 40 MPa. Here, the tensile strength means a value obtained by dividing the maximum tensile load until the specimen is broken in the tensile test by the cross-sectional area of the specimen before tension.

For example, the base film may be selected so that an absolute value of the difference between the elongation rate thereof and the elongation rate of the polarizing functional material layer falls within a range of 15% to 500%. In another example, the absolute value of the difference may be 20% or more. Also, in another example, the absolute value of the difference may be 400% or less, 300% or less, 200% or less, or 160% or less.

For example, the base film may be selected so that an absolute value of the difference between the yield point thereof and the yield point of the polarizing functional material layer falls within a range of 1 MPa to 50 MPa. In another example, the absolute value of the difference may be 3 MPa or more or 5 MPa or more. Also, in another example, the absolute value of the difference may be 45 MPa or less, 40 MPa or less, or 35 MPa or less.

For example, the base film may be selected so that an absolute value of the difference between the elastic limit thereof and the elastic limit of the polarizing functional material layer falls within a range of 1,000 MPa or less. In another example, the absolute value of the difference may be at least 50 MPa, at least 100 MPa, at least 150 MPa, at least 200 MPa, or at least 230 MPa. Also, in another example, the absolute value of the difference may be 900 MPa or less, 800 MPa or less, 700 MPa or less, or 660 MPa or less.

The physical properties of the base film may be controlled as above by a method of adjusting the composition of the TPU used in the production of the base film in the above-mentioned category, or by a method of appropriately combining such a TPU or the known TPU with the inorganic particles to produce a film, and the like.

The present application relates to a laminate comprising the base film and a polarizing functional material layer formed on one or both sides of the base film, for example, a laminate for elongation. Such a laminate may be elongated to form a film exhibiting a polarization function (hereinafter, referred to as a polarizing film).

The type of the polarizing functional material layer is not particularly limited as long as it can exhibit a polarization function by elongation, for example, a function capable of extracting only light vibrating in one direction from light incident while vibrating in various directions, and typically, a layer comprising a PVA-based resin can be exemplified. The PVA-based resin can be obtained, for example, by gelation of a polyvinyl acetate-based resin. The polyvinyl acetate-based resin that can be used at this time may include not only a homopolymer of vinyl acetate but also a copolymer of vinyl acetate and other monomers copolymerizable therewith. An example of the monomer copolymerizable with vinyl acetate may include one of two or more from unsaturated carboxylic acids, olefins, vinyl ethers, unsaturated sulfonic acids, and acrylamides having an ammonium group, or a mixture of two or more thereof, but is not limited thereto. The degree of gelation of the PVA-based resin is usually 85 mol % to 100 mol % or so, or 98 mol % or more, but is not limited thereto. The PVA-based resin may be further modified, and for example, polyvinyl formal or polyvinyl acetal modified with aldehydes and the like may also be used. The degree of polymerization of the PVA-based resin may usually be 1,000 to 10,000 or so, or 1,500 to 5,000 or so.

The method for forming the polarizing functional material layer comprising the PVA-based resin or the like on one or both sides of the base film is not particularly limited. For example, it may be formed by applying a method of coating a coating liquid prepared by dissolving a material such as the PVA-based resin in a solvent such as water on the base film, or by laminating a film formed by forming a raw material such as the PVA-based resin into a film (hereinafter, optionally referred to as a polarizing functional film), for example, a PVA-based resin film or the like laminated on the base film. Although being not particularly limited, it is possible to use a method of attaching the polarizing function film to the base film among the above-described manners in consideration of the proper elongating process and the function of the polarizing film obtained after elongation. In this process, the lamination of the polarizing functional film can be carried out directly on the base film without a separate layer, and can be carried out using an adhesive or the like. The kind of the adhesive layer usable in this process is not particularly limited, and for example, an aqueous PVA-based adhesive layer or the like usually used for attaching the polarizing film and the protective film at the time of producing a polarizing plate can be used. In addition, the surface of the base film on which the polarizing functional material layer is formed may be subjected to known adhesion facilitating treatment such as corona treatment or primer treatment.

In the laminate, a dichroic material may be dyed in the polarizing functional material layer. Any kind of dichroic material may be used as long as it is known that it exhibits appropriate dichroism and can be used in the production of a polarizing film. An example of the dichroic material can be exemplified by an iodide, an organic dye, and a mixture thereof, and the like, and an example of the iodide can be exemplified by lithium iodide, sodium iodide, zinc iodide, aluminum iodide, lead iodide, copper iodide, valium iodide, calcium iodide, tin iodide or titanium iodide, and the like, but is not limited thereto.

The thickness (thickness before elongation) of the polarizing functional material layer in the laminate is not particularly limited, and may be selected within an appropriate range in consideration of the thickness after elongation. For example, the thickness of the polarizing functional material layer may be in the range of 15 µm to 100 µm. In another example, the thickness range may be in the range of 20 µm to 90 µm, 20 µm to 80 µm, 20 µm to 70 µm, 20 µm to 60 µm, 20 µm to 50 µm or 20 µm to 40 µm.

The present application also relates to a method for producing a polarizing film comprising elongating the laminate, that is, the laminate comprising a base film and a polarizing functional material layer formed on one or both sides of the base film.

A dyeing process may be performed, in which the polarizing functional material layer is dyed with the dichroic material exemplified as described above before elongating the laminate. The dyeing process can be carried out, for example, by immersing the laminate in a dyeing solution. The dyeing solution can be prepared, for example, by dissolving the above-mentioned dichroic material in a solvent. As a solvent for the dyeing solution, usually water is used. The ratio of the dichroic material in the dyeing solution is not particularly limited. Typically, the dyeing solution may comprise about 0.1 to 4.3 parts by weight of a dichroic material, relative to 100 parts by weight of the solvent. As the dichroic material, the above-mentioned materials can be used. When iodine is used as the dichroic material, an iodide can be further added to the dyeing solution from the viewpoint of promoting dissolution of iodine and improving dyeing efficiency. The iodide may be added in an amount of about 0.02 parts by weight to 20 parts by weight, or 0.1 parts by weight to 10 parts by weight, relative to 100 parts by weight of the solvent, but is not limited thereto. The iodide can be exemplified by potassium iodide, lithium iodide, sodium iodide, zinc iodide, aluminum iodide, lead iodide, copper iodide, barium iodide, calcium iodide, tin iodide or titanium iodide, and the like, but is not limited thereto. The time of immersion into the dyeing solution is usually 5 seconds to 5 minutes or so, and the temperature of the dyeing solution in this process may be usually within a range of 20° C. to 50° C., but is not limited thereto.

Following the dyeing process or without the dyeing process, the elongating process may proceed. The method of carrying out the elongating process is not particularly limited and can be carried out in a known manner. The elongation of the laminate can be carried out in a solution, for example, an aqueous solution. The temperature of the solution in which the elongating process is performed is not particularly limited as long as proper elongation can be performed, and may be usually in the range of 85° C. or less, 20° C. to 70° C., or 30° C. to 65° C. The elongation may be performed such that the elongated polarizing film has a thickness in the range of about 10 μm or less, about 8 μm or less, about 7 μm or less, about 6 μm or less, or about 5 μm or less. The lower limit of the thickness of the elongated polarizing film is not particularly limited and may be, for example, about 0.5 μm or more, 1 μm or more, 1.5 μm or more, 2 μm or more, or about 2.5 μm or more or so. For this purpose, the elongation can be carried out at a draw ratio of, for example, about 2 to 15 times or about 5 to 15 times or so. The dichroic material of the polarizing functional material layer or the polarizing film can be appropriately oriented within the range of the above-described draw ratio.

If necessary, the elongating process can be carried out together with a cross-linking process. The cross-linking process can be carried out, for example, by immersing the laminate in an aqueous solution of boric acid, and when the elongating process is carried out in the aqueous solution of boric acid, the elongation may proceed with the cross-linking. The cross-linking process is also a process of insolubilizing the PVA-based resin of the swollen polarizing functional material layer or polarizing film so as not to dissolve in water.

The aqueous solution of boric acid can be obtained by dissolving boric acid or borates in water as a solvent. In addition to boric acid or borates, boron compounds such as boron, glyoxal or glutaraldehyde and the like may also be used. The boric acid concentration is not particularly limited, and is usually adjusted so that boric acid is present in a ratio of 1 part by weight to 10 parts by weight relative to 100 parts by weight of water. For example, an iodide can be added to the aqueous solution of boric acid for the purpose of inhibiting the elution of iodine adsorbed to the PVA-based resin layer, which is a material of the polarizing functional layer. The concentration of the iodide may be generally from 0.05 to 15% by weight or from 0.5 to 8% by weight. As the iodide, the substances mentioned in the dyeing process can be used. The time of immersion into the aqueous solution of boric acid may be usually 15 seconds to 5 minutes or so, and the temperature of the aqueous solution of boric acid may be usually in the range of 20° C. to 70° C.

The above-mentioned cross-linking process may be carried out before the dyeing process. In this case, the process may proceed in the order of cross-linking, dyeing and elongating, using an aqueous solution of boric acid. For the purpose of producing a thin polarizing film, it may be effective to perform the cross-linking process before the dyeing process, since dissolution of the material of the polarizing functional material layer, for example, the PVA-based resin, into the dyeing solution may occur during the dyeing process. If necessary, in the previous process of the elongating process, the cross-linking process by a separate aqueous solution of boric acid may also be carried out from the viewpoint of reinforcing the boric acid reduced in the dyeing process.

After the elongating process, a cleaning process can be performed. The cleaning process is a process of cleaning the residue of the laminate film comprising the elongated polarizing film. If this treatment is insufficient, boric acid also precipitates from the thin polarizing film after drying the laminate. For example, the cleaning may be performed in a cleaning liquid containing potassium iodide so that a material such as the PVA-based resin does not dissolve. The concentration of potassium iodide in the cleaning liquid may be generally 0.5 to 10% by weight or so. The temperature of the cleaning liquid may be generally from 10° C. to 50° C. or so, and the immersion time may be usually from 1 second to 1 minute or so, but is not limited thereto.

Subsequently, the drying process can proceed. The drying process can be carried out by a known appropriate method, for example, a method such as natural drying, blow drying or heat drying. The temperature and time of drying are not particularly limited and may be adjusted so that proper drying can be performed.

The laminate comprising the elongated polarizing film may also be used as it is, or after peeling the base film off, if necessary. If necessary, the base film may also be peeled off from the polarizing film through an appropriate transfer process, and transferred to another optically functional film.

Advantageous Effects

The present application can provide a base film for elongation which can be effectively applied in, for example, manufacturing a polarizing film and the like by simultaneously maintaining an elongation rate and a recovery rate at appropriate levels and securing water resistance. The present application can also provide a laminate using the film or a method for producing a polarizing film using the base film. The base film can be effectively applied in manufacturing a polarizing film having excellent functions such as polarization performance while, for example, having a thickness of about 10 μm or less, about 8 μm or less, about 7 μm or less, about 6 μm or less, or about 5 μm or less.

BRIEF DESCRIPTION OF DRAWING

The FIGURE is a cross-sectional view of one exemplary laminate.

EXPLANATION OF REFERENCE NUMERALS

100: laminate
101: base film
102: polarizing functional material layer or polarizing film

MODE FOR INVENTION

Hereinafter, the above-mentioned contents will be described in detail by way of examples, but the scope of the present application is not limited by the following examples.

1. Evaluation of Tensile Characteristics

The tensile characteristics of a base film were evaluated in the following manner. A specimen was prepared by tailoring a base film in Examples so as to have a width of 15 mm and a length of 90 mm. Subsequently, after wrapping the top and the bottom in the longitudinal direction by 10 mm taping, the taped portions were fixed to a measuring instrument (XP plus, manufactured by TA). Subsequently, a graph of the force (X-axis: distance, Y-axis: distance) measured according to the distance until the specimen is cut while tensioning the specimen in the longitudinal direction at a tensile rate of 300 mm/min at room temperature was depicted and the graph was represented as a graph of elongation rate and tensile strength (X-axis: elongation rate, Y-axis: tensile strength) by applying the width and thickness of the specimen, from which each tensile characteristic was then evaluated. A method of evaluating tensile characteristics such as tensile elastic modulus, tensile elastic coefficient and elongation rate from a tensile curve is known.

2. Evaluation of Recovery Rate

The recovery rate was evaluated in the following manner. First, a base film in Examples is tailored so that the width is 50 mm and the length is 100 mm. Thereafter, a polyvinyl alcohol film having the same width and length as those of the base film and a thickness of 30 μm is adhered to one side of the base film to produce a laminate. Here, the adhesion of the polyvinyl alcohol film and the base film is carried out using a conventional aqueous polyvinyl alcohol-based adhesive. Thereafter, the laminate is immersed in water (temperature: 60° C.) and then elongated five times in the longitudinal direction. Then, after removing the laminate from water, peeling the polyvinyl alcohol film off and holding it at room temperature for 1 hour, the longitudinal length (T) of the base film is measured. Subsequently, the measured length (T) is substituted into the equation "100×(T−A)/A" to obtain the recovery rate. In the equation, A is a longitudinal length of the base film before elongation.

3. Evaluation of Water Resistance

The water resistance was evaluated in the following manner. First, a base film in Examples is tailored so that the width is 50 mm and the length is 100 mm. Thereafter, a polyvinyl alcohol film having the same width and length as those of the base film and a thickness of 30 μm is adhered to one side of the base film to produce a laminate. Here, the adhesion of the polyvinyl alcohol film and the base film is carried out using a conventional aqueous polyvinyl alcohol-based adhesive. Thereafter, after immersing the laminate in water (temperature: 60° C.) and then maintaining it at room temperature for a certain period of time, it was reviewed whether water penetrated the edge to evaluate the water resistance according to the following criteria by taking the laminate out and separating the base film from the laminate.

<Water Resistance Evaluation Criteria>

A: when penetration of water is not confirmed, since water does not penetrate or finely penetrates the edge of the base film, B: when water slightly penetrates the edge of the base film C: when a large amount of water penetrates the edge of the base film

Production Example 1. Production of Base Film (TPU Film (A))

Using a mixture comprising a polyester polyol having a molecular weight (Mw) of about 2,000 prepared by a known esterification reaction of adipic acid and 1,4-butane diol and a polyester polyol having a molecular weight (Mw) of about 1,000 prepared by the same reaction, methylene diphenyl diisocyante (MDI) as a multivalent isocyanate, and 1,4-butanediol (BD) and neopentyl glycol (NPG) as a chain extender, a TPU film was produced in a known manner. The polyol, in which the polyester polyol having a molecular weight (Mw) of about 2,000 and the polyester polyol having a molecular weight (Mw) of about 1,000 were mixed in a weight ratio of 1:1, and the MDI were added in a weight ratio of 35:48 (polyol:MDI) to a reactor and reacted with stirring under a nitrogen atmosphere to prepare an isocyanate-terminal prepolymer. Subsequently, the chain extender was further added so that the weight ratio with the added polyol was 35:12:5 (polyol:BD:NPG), and reacted while stirring under a nitrogen atmosphere until the content of isocyanate in the reactor reached 0 to synthesize the TPU having a molecular weight (Mw) of about 181,000. The synthesized TPU was cast to produce the TPU film having a thickness of about 50 μm.

Production Example 2. Production of Base Film (TPU Film (B))

A TPU was synthesized in the same manner as in Production Example 1, except that the chain extender was further added to the isocyanate-terminal prepolymer prepared by reacting the polyol, in which the polyester polyol having a molecular weight (Mw) of about 2,000 and the polyester polyol having a molecular weight (Mw) of about 1,000 were mixed in a weight ratio of 1:1, and methylene diphenyl diisocyanate (MDI) as the multivalent isocyante in a weight ratio of 30:50 (polyol:MDI), so that the weight ratio with the added polyol was 30:10:10 (polyol:BD:NPG), and reacted while stirring under a nitrogen atmosphere until the content of isocyante in the reactor reached 0 to synthesize the TPU having a molecular weight (Mw) of about 212,000. The synthesized TPU was cast to prepare the TPU film having a thickness of about 50 μm.

Production Example 3. Production of Base Film (TPU Film (C))

A TPU was synthesized in the same manner as in Production Example 1, except that the chain extender was further added to the isocyanate-terminal prepolymer prepared by reacting the polyol, in which the polyester polyol having a molecular weight (Mw) of about 2,000 and the polyester polyol having a molecular weight (Mw) of about 1,000 were mixed in a weight ratio of 1:1, and methylene diphenyl diisocyanate (MDI) and toluene diisocyanate (TDI, 2,4-toluene diisocyanate) as the multivalent isocyante in a weight ratio of 30:47.5:2.5 (polyol:MDI:TDI), so that the weight ratio with the added polyol was 30:10:10 (polyol:BD:NPG), and reacted while stirring under a nitrogen atmosphere until the content of isocyante in the reactor reached 0 to synthesize the TPU having a molecular weight (Mw) of about 205,000. The synthesized TPU was cast to prepare the TPU film having a thickness of about 50 μm.

Production Example 4. Production of Base Film (TPU Film (D))

A TPU was synthesized in the same manner as in Production Example 1, except that the chain extender was further added to the isocyanate-terminal prepolymer prepared by reacting the polyol, in which the polyester polyol having a molecular weight (Mw) of about 2,000 and the polyester polyol having a molecular weight (Mw) of about 1,000 were mixed in a weight ratio of 1:1, and methylene diphenyl diisocyanate (MDI) and toluene diisocyanate (TDI, 2,4-toluene diisocyanate) as the multivalent isocyante in a weight ratio of 30:47.5:2.5 (polyol:MDI:TDI), so that the weight ratio with the added polyol was 30:9:11 (polyol:BD:NPG), and reacted while stirring under a nitrogen atmosphere until the content of isocyante in the reactor reached 0 to synthesize the TPU having a molecular weight (Mw) of about 150,000. The synthesized TPU was cast to prepare the TPU film having a thickness of about 50 μm.

Production Example 5. Production of Base Film (TPU Film (E))

A TPU was synthesized in the same manner as in Production Example 1, except that the chain extender was further added to the isocyanate-terminal prepolymer prepared by reacting the polyol, in which the polyester polyol having a molecular weight (Mw) of about 2,000 and the polyester polyol having a molecular weight (Mw) of about 1,000 were mixed in a weight ratio of 1:1, and methylene diphenyl diisocyanate (MDI) and toluene diisocyanate (TDI, 2,4-toluene diisocyanate) as the multivalent isocyante in a weight ratio of 30:47.5:2.5 (polyol:MDI:TDI), so that the weight ratio with the added polyol was 30:9:11 (polyol:BD:NPG), and reacted while stirring under a nitrogen atmosphere until the content of isocyante in the reactor reached 0 to synthesize the TPU having a molecular weight (Mw) of about 216,000. The synthesized TPU was cast to prepare the TPU film having a thickness of about 50 μm.

Production Example 6. Production of Base Film (TPU Film (F))

A TPU was synthesized in the same manner as in Production Example 1, except that the chain extender was further added to the isocyanate-terminal prepolymer prepared by reacting the polyol, in which the polyester polyol having a molecular weight (Mw) of about 2,000 and the polyester polyol having a molecular weight (Mw) of about 1,000 were mixed in a weight ratio of 1:1, and methylene diphenyl diisocyanate (MDI) and toluene diisocyanate (TDI, 2,4-toluene diisocyanate) as the multivalent isocyante in a weight ratio of 30:47.5:2.5 (polyol:MDI:TDI), so that the weight ratio with the added polyol was 30:9:11 (polyol:BD:NPG), and reacted while stirring under a nitrogen atmosphere until the content of isocyante in the reactor reached 0 to synthesize the TPU having a molecular weight (Mw) of about 305,000. The synthesized TPU was cast to prepare the TPU film having a thickness of about 50 μm.

Production Example 7. Preparation of Base Film (TPU Film (G))

A TPU was synthesized in the same manner as in Production Example 1, except that the chain extender was further added to the isocyanate-terminal prepolymer prepared by reacting the polyol, in which the polyester polyol having a molecular weight (Mw) of about 2,000 and the polyester polyol having a molecular weight (Mw) of about 1,000 were mixed in a weight ratio of 1:1, and methylene diphenyl diisocyanate (MDI) and toluene diisocyanate (TDI, 2,4-toluene diisocyanate) as the multivalent isocyante in a weight ratio of 30:47.5:2.5 (polyol:MDI:TDI), so that the weight ratio with the added polyol was 30:10:10 (polyol:BD:NPG), and reacted while stirring under a nitrogen atmosphere until the content of isocyante in the reactor reached 0 to synthesize the TPU having a molecular weight (Mw) of about 201,000, and a material prepared by mixing the TPU with about 0.05 parts by weight of inorganic particles (talc) relative to 100 parts by weight of the TPU was cast to prepare the TPU film having a thickness of about 50 μm.

The evaluation results of elongation rate, recovery rate and water resistance of each base film as prepared above were summarized and described in Table 1 below.

TABLE 1

| | Elongation Rate (unit: %) | Recovery Rate (unit: %) | Water Resistance |
|---|---|---|---|
| Production Example 1 | 790 | 11.5 | A |
| Production Example 2 | 900 | 13.5 | A |
| Production Example 3 | 1060 | 15 | B |
| Production Example 4 | 1070 | 13.3 | A |

TABLE 1-continued

| | Elongation Rate (unit: %) | Recovery Rate (unit: %) | Water Resistance |
|---|---|---|---|
| Production Example 5 | 1050 | 11.7 | A |
| Production Example 6 | 960 | 12 | A |
| Production Example 7 | 920 | 13 | A |

Example 1

A PVA-based resin film was laminated on one side of the TPU film (A) produced in Production Example 1 with an aqueous PVA-based adhesive to produce a laminate. Subsequently, the laminate was immersed in a dyeing solution (solvent:water) containing iodine and potassium iodide at a temperature of about 30° C. for an appropriate time to adsorb iodine on the PVA-based resin film. The content of iodine in the dyeing solution was about 0.1 parts by weight relative to 100 parts by weight of water, and the content of potassium iodide was about 0.7 parts by weight relative to 100 parts by weight of water. Subsequently, the laminate was immersed in an aqueous solution of boric acid containing boric acid and potassium iodide at a temperature of about 60° C., and elongated until the final PVA-based resin film had a thickness of about 5.8 μm (draw ratio: about 5.6 times). It was confirmed that a polarizing film having a transmittance of about 40% or more and a polarization degree of 99% or more was produced when they were measured after peeling the PVA-based resin film off from the elongated laminate.

Example 2

A polarizing film was produced in the same manner as in Example 1, except that the TPU film (B) produced in Production Example 2 was used. The produced polarizing film had a transmittance of about 40% or more and a polarization degree of about 99% or more.

Example 3

A polarizing film was produced in the same manner as in Example 1, except that the TPU film (C) produced in Production Example 3 was used. The produced polarizing film had a transmittance of about 40% or more and a polarization degree of about 99% or more.

Example 4

A polarizing film was produced in the same manner as in Example 1, except that the TPU film (D) produced in Production Example 4 was used. The produced polarizing film had a transmittance of about 40% or more and a polarization degree of about 99% or more.

Example 5

A polarizing film was produced in the same manner as in Example 1, except that the TPU film (E) produced in Production Example 5 was used. The produced polarizing film had a transmittance of about 40% or more and a polarization degree of about 99% or more.

Example 6

A polarizing film was produced in the same manner as in Example 1, except that the TPU film (F) produced in Production Example 6 was used. The produced polarizing film had a transmittance of about 40% or more and a polarization degree of about 99% or more.

Example 7

A polarizing film was produced in the same manner as in Example 1, except that the TPU film (G) produced in Production Example 7 was used. The produced polarizing film had a transmittance of about 40% or more and a polarization degree of about 99% or more.

The invention claimed is:

1. A base film for elongation comprising a thermoplastic polyurethane which is a reaction product of a mixture comprising a polyol, a multivalent isocyanate and a chain extender,
wherein said multivalent isocyanate comprises a multivalent isocyanate having an aromatic core having 12 or more carbon atoms and a multivalent isocyanate having an aromatic core having less than 12 carbon atoms, and
wherein the base film satisfies the following Equation 1:

$$E/R \geq 5 \quad \text{[Equation 1]}$$

wherein, E is an elongation rate (unit: %) of said base film measured at room temperature, and R is a recovery rate (unit: %), and said recovery rate is a value measured by substituting a longitudinal length (T) of the base film, which is measured after elongating a laminate prepared by attaching to one side of said base film tailored to have a width of 50 mm and a length of 100 mm a PVA film having the same width and length and a thickness of 30 μm in water (temperature: 60° C.) five times in the longitudinal direction, and then taking it out from water, peeling said PVA film off, and maintaining the base film at room temperature for 1 hour, into an equation "100×(T−A)/A," where A is a longitudinal length of said base film before elongation,
wherein the ratio (C/D) of the weight (C) of the multivalent isocyanate having an aromatic core having 12 or more carbon atoms and the weight (D) of the multivalent isocyanate having an aromatic core having less than 12 carbon atoms is 5 to 30.

2. The base film for elongation according to claim 1, wherein the chain extender comprises an aliphatic diol having 5 or more carbon atoms and an aliphatic diol having 4 or less carbon atoms.

3. The base film for elongation according to claim 2, wherein the aliphatic diol having 4 or less carbon atoms is contained in a ratio of 30 parts by weight or less relative to 100 parts by weight of the polyol.

4. The base film for elongation according to claim 2, wherein the ratio (A/B) of the weight (B) of the aliphatic diol having 5 or more carbon atoms and the weight (A) of the aliphatic diol having 4 or less carbon atoms is 1 or less.

5. The base film for elongation according to claim 1, wherein the base film comprises inorganic particles.

6. The base film for elongation according to claim 5, wherein the inorganic particles are talc or calcium carbonate.

7. The base film for elongation according to claim 5, comprising 0.01 to 10 parts by weight of the inorganic particles relative to 100 parts by weight of the polyurethane.

8. The base film for elongation according to claim 1, wherein the polyol is a polyester polyol.

9. The base film for elongation according to claim 1, wherein the polyol comprises a first polyol having a weight average molecular weight of 1,500 or less and a second polyol having a weight average molecular weight of more than 1,500.

10. The base film for elongation according to claim 1, wherein the polyol comprises a first polyol having a weight average molecular weight of 1,500 or less and a second polyol having a weight average molecular weight of more than 1,500, and said second polyol is contained in a ratio of 50 parts by weight to 200 parts by weight relative to 100 parts by weight of said first polyol.

11. The base film for elongation according to claim 1, wherein the multivalent isocyanate having an aromatic core having 12 or more carbon atoms is contained in the mixture in an amount of at least 150 parts by weight relative to 100 parts by weight of the polyol.

12. The base film for elongation according to claim 1, wherein the polyurethane has a weight average molecular weight in a range of 100,000 to 400,000.

13. The base film for elongation according to claim 1, having an elongation rate in a range of 200% to 1500%.

14. The base film for elongation according to claim 1, having a tensile strength in a range of 20 MPa to 200 MPa.

15. The base film for elongation according to claim 1, having a yield point in a range of 10 MPa to 150 MPa.

16. The base film for elongation according to claim 1, having an elastic limit in a range of 200 MPa to 1,000 MPa.

17. A laminate comprising the base film of claim 1; and a polarizing functional material layer formed on one or both sides of said base film.

18. A method for producing a polarizing film comprising elongating the laminate of claim 17.

* * * * *